(12) United States Patent
Kwok

(10) Patent No.: US 8,649,164 B1
(45) Date of Patent: Feb. 11, 2014

(54) ERGONOMIC REARWARD KEYBOARD

(71) Applicant: Sze Wai Kwok, Hong Kong (HK)

(72) Inventor: Sze Wai Kwok, Hong Kong (HK)

( * ) Notice: Subject to any disclaimer, the term of this patent is extended or adjusted under 35 U.S.C. 154(b) by 0 days.

(21) Appl. No.: 13/744,392

(22) Filed: Jan. 17, 2013

(51) Int. Cl.
G06F 1/16 (2006.01)

(52) U.S. Cl.
USPC .................................. 361/679.09; 361/679.14

(58) Field of Classification Search
USPC ........................................ 361/679.08–679.17
See application file for complete search history.

(56) References Cited

U.S. PATENT DOCUMENTS

| | | | | |
|---|---|---|---|---|
| 5,067,834 | A * | 11/1991 | Szmanda et al. | 400/489 |
| 5,267,127 | A * | 11/1993 | Pollitt | 361/679.15 |
| 5,278,779 | A * | 1/1994 | Conway et al. | 361/679.16 |
| 5,410,333 | A * | 4/1995 | Conway | 345/169 |
| 5,596,480 | A * | 1/1997 | Manser et al. | 361/679.14 |
| 5,644,338 | A * | 7/1997 | Bowen | 345/168 |
| 5,717,431 | A * | 2/1998 | Chia-Ying et al. | 345/168 |
| 5,734,548 | A * | 3/1998 | Park | 361/679.14 |
| 6,107,988 | A * | 8/2000 | Phillipps | 345/156 |
| 6,118,432 | A * | 9/2000 | Kotorov et al. | 345/168 |
| 6,297,752 | B1 * | 10/2001 | Ni | 341/22 |
| 6,304,431 | B1 * | 10/2001 | Kim | 361/679.09 |
| 6,625,011 | B2 * | 9/2003 | Hyun | 361/679.11 |
| 7,269,000 | B2 * | 9/2007 | Webb et al. | 361/679.27 |
| 7,333,321 | B2 * | 2/2008 | Sutton et al. | 361/679.09 |
| D627,774 | S * | 11/2010 | Setthalath et al. | D14/318 |
| 7,948,475 | B2 * | 5/2011 | Lee et al. | 345/169 |
| 8,279,589 | B2 * | 10/2012 | Kim | 361/679.15 |
| 8,289,702 | B2 * | 10/2012 | Karwan | 361/679.55 |
| 2001/0010618 | A1 * | 8/2001 | Zamora et al. | 361/680 |
| 2001/0010620 | A1 * | 8/2001 | Zamora et al. | 361/683 |
| 2003/0117374 | A1 * | 6/2003 | McCloud | 345/168 |
| 2005/0104855 | A1 * | 5/2005 | Grossmeyer | 345/169 |
| 2007/0201931 | A1 * | 8/2007 | Bowen et al. | 400/486 |
| 2007/0268261 | A1 * | 11/2007 | Lipson | 345/169 |
| 2008/0285214 | A1 * | 11/2008 | Kohmoto et al. | 361/680 |

* cited by examiner

*Primary Examiner* — Adrian S Wilson
(74) *Attorney, Agent, or Firm* — Ella Cheong Hong Kong; Sam T. Yip

(57) ABSTRACT

A keyboard that is attached on to the back of a mobile computing device, having keys that are facing rearward away from the user as the user holds and faces the display screen of the mobile computing device. When the user holds the mobile computing device with both hands at the bottom or side edges, his/her fingers are free to press the rearward-facing keys of the attached keyboard. The keys are divided into one partial field for the left-hand fingers and another partial field for the right-hand fingers. The keys within their respective partial fields are placed in mirror-opposite of the positions that would have been in a front-facing keyboard that is laid before the user. This rearward-facing key orientation allows the user to use the same rapid typing system, such as that of the QWERTY keyboard layout, on the rearward-facing keyboard as he/she would on a traditional front-facing keyboard.

15 Claims, 3 Drawing Sheets

ERGONOMIC REARWARD KEYBOARD

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to keyboards and user input interfaces used in computing devices. Specifically, the present invention relates to ergonomic keyboards for mobile computing devices such as tablet computers that can be arranged into various typing positions suitable for high mobility.

BACKGROUND

The modern-day computer keyboards were adapted from the typewriters, which were in existence from as early as the eighteen-hundreds. The most common keyboard layout is the QWERTY keyboard layout. The name comes from the first six letters appearing in the top left row of keys on the keyboard, reading from left to right: Q-W-E-R-T-Y. The QWERTY keyboard layout enables a system of rapid typing. With some degree of training, a user can type without looking at the keys. There are alternative keyboard layouts to the QWERTY keyboard layout, such as the Dvorak Simplified Keyboard. Various keyboard layout adaptations have also been made for non-Latin based languages. Nonetheless, all these keyboard layouts are designed with the same purpose of allowing typing fast and intuitive without the need of visual guidance.

Throughout the years, improvements have been made to the classical keyboard layouts. For example, horizontal tilting with the rows of keys being gradually higher away from the user was introduced with the intention of avoiding the unnatural angling of the hands. Other ergonomic designs include dividing the keys into two partial fields, wherein the rows of keys are parallel to each other in each partial field and the two partial fields are pivoted about a vertical axis such that they are arranged at an angle with regard to each other so that they form a wedge-like shape pointing toward the user. Another design raises the height in between the two aforementioned partial fields causing the two partial fields to tilt outward from the center of the keyboard. The goal is to allow a more natural positioning of the hands and fingers during typing, in turn lessen strain and fatigue of its user.

All of these improvements rest on the premises of that the keyboard is placed before the user and in front of the foot of the display monitor. This fundamental design works well in desktop and laptop computers. However, with the emergence of tablet computers and other mobile computing form factors, the keyboard has become unnecessary and in some cases an impediment to the mobility of these devices. For instance, since the effective operation of the keyboard requires keystrokes made by fingers in both hands, the keyboard must be placed on a surface or secured hands-free. This works in contradiction to the usage of tablet computers and mobile computing devices that they are often being single-handedly held while the users are roaming around.

However, for substantial amount of textual-type input, such as in the case of composing a long message, the keyboard is still the preferred mechanism. Therefore, there exists an unmet need for a keyboard for tablet computers and mobile computing devices that will not inhibits the mobility of such devices.

SUMMARY

It is an objective of the presently claimed invention to provide an ergonomic keyboard for tablet computers and mobile computing devices that allows the user to type with both hands naturally while holding the devices at the same time.

In accordance to one embodiment of the presently claimed invention, a keyboard is attached on to the back of a tablet computer or mobile computing device. The front of the tablet computer or mobile computing device is the display screen. The keyboard is attached on to the back of the tablet computer or mobile computing device in a way that the back of the keyboard is facing and parallel to the back of the tablet computer or mobile computing device while the keys are facing rearward away from the user as the user is holding and facing the display screen of the tablet computer or mobile computing device.

When the user holds the tablet computer or mobile computing device with both hands at the bottom or side edges of the tablet computer or mobile computing device, his/her fingers are free to press the rearward-facing keys of the attached keyboard. The keyboard layout of the rearward-facing keyboard is such that the keys are divided into two partial fields. One partial field contains the keys for the left-hand fingers and the other partial field contains the keys for the right-hand fingers. Then the key arrangements within their respective partial fields is such that the keys are placed in mirror-opposite of the positions that would have been in a front-facing keyboard that is laid before the user. This rearward-facing key orientation allows the user to use the same rapid typing system, such as that of the QWERTY keyboard layout, on the rearward-facing keyboard as he/she would on a traditional front-facing keyboard.

In accordance to various embodiments of the presently claimed invention, the rearward-facing keyboard can be a built-in feature of the tablet computer or mobile computing device, or a detachable ancillary peripheral to the tablet computer or mobile computing device.

In accordance to another embodiment of the presently claimed invention, the rearward-facing keyboard can be flipped, being hinge-connected to one edge of the tablet computer or mobile computing device, from the back of the tablet computer or mobile computing device to the front of and proximately perpendicular to the tablet computer or mobile computing device, resembling a laptop computer. In this position, the keyboard is laid before the user. Each of the two partial fields of keys can then rotate outward about a vertical axis such that keys in their new positions correspond approximately to those of a traditional keyboard.

In accordance to various embodiments of the presently claimed invention, the keys of the rearward-facing keyboard can either be mechanical tactile keys or touch sensing keys.

BRIEF DESCRIPTION OF THE DRAWINGS

Embodiments of the invention are described in more detail hereinafter with reference to the drawings, in which.

DETAILED DESCRIPTION

In the following description, apparatuses for facilitating user keystroke input and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1:
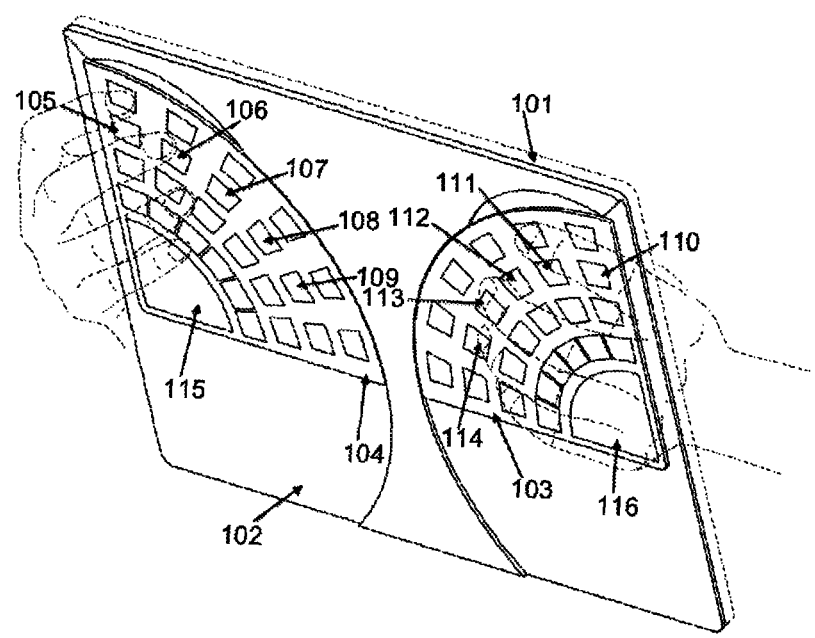
FIG. 1 shows a diagram illustrating a rearward-facing keyboard that is attached to the back of a tablet computer and being held by both hands of a user in a rearward-typing position in accordance to one embodiment of the presently claimed invention.

Referring to FIG. 1. In accordance to one embodiment of the presently claimed invention, a keyboard 102 is attached on to the back of a tablet computer or mobile computing device 101. The front of the tablet computer or mobile computing device 101 is the display screen. The keyboard 102 is attached on to the back of the tablet computer or mobile computing device 101 in a way that the back of the keyboard is facing and parallel to the back of the tablet computer or mobile computing device while the keys are facing rearward away from the user as the user is holding and facing the display screen of the tablet computer or mobile computing device.

When the user holds the tablet computer or mobile computing device with both hands at the bottom or the two side edges of the tablet computer or mobile computing device 101, his/her fingers are free to press the rearward facing keys of the attached keyboard 102. The keyboard layout of the rearward-facing keyboard is such that the keys are divided into two partial fields 103 and 104. The partial field 103 contains the keys for the left-hand fingers and the partial field 104 contains the keys for the right-hand fingers. Then the key arrangements within their respective partial fields is such that the keys are placed in mirror-opposite of the positions that they would have been in a front-facing keyboard that is laid before the user. This rearward facing key orientation allows the user to use the same rapid typing system, such as that of the QWERTY keyboard layout, on the rearward-facing keyboard as he/she would on a traditional front-facing keyboard.

To illustrate this mirror-opposite orientation of the QWERTY keyboard layout, as shown in FIG. 1, key 105 is for the letter "Y", key 106 is for the letter "U", key 107 is for the letter "I", key 108 is for the letter "O", key 109 is for the letter "P", key 110 is for the letter "T", key 111 is for the letter "R", key 112 is for the letter "E", key 113 is for the letter "W", and key 114 is for the letter "Q". Keys 115 and 116 are the space bars. Other letter, number, and symbol keys are then placed at their respective positions accordingly.

In accordance to various embodiments of the presently claimed invention, the rearward-facing keyboard can be a built-in feature of the tablet computer or mobile computing device or a detachable ancillary peripheral to the tablet computer or mobile computing device. In the case of a detachable peripheral, the keyboard can be electrically connected to the tablet computer or mobile computing device for data signal exchanges through wired communication link conforming to one or more industrial standards such as the Universal Serial Bus (USB) and IEEE 1394 standards. The electrical connection can also be made through wireless communication link conforming to one or more industrial standards such as the Wi-Fi and Bluetooth standards. Other wired and wireless communication protocols can also be adopted without undue experiment and be prepared by practitioners skilled in the electronic art based on the teachings of the present disclosure.

In accordance to another embodiment of the presently claimed invention, the rows of keys within each of the partial fields curve to form parallel arcs such that each partial field of keys proximately resembles a quarter slice of a circle. The curve of each partial field faces the inner top of the keyboard. This keyboard layout enhances the ergonomics of the rearward-facing keyboard by matching closely to the natural positions of the fingers and angling of the hands while holding the tablet computer or mobile computing device and typing on the rearward-facing keyboard.

Figure 2:
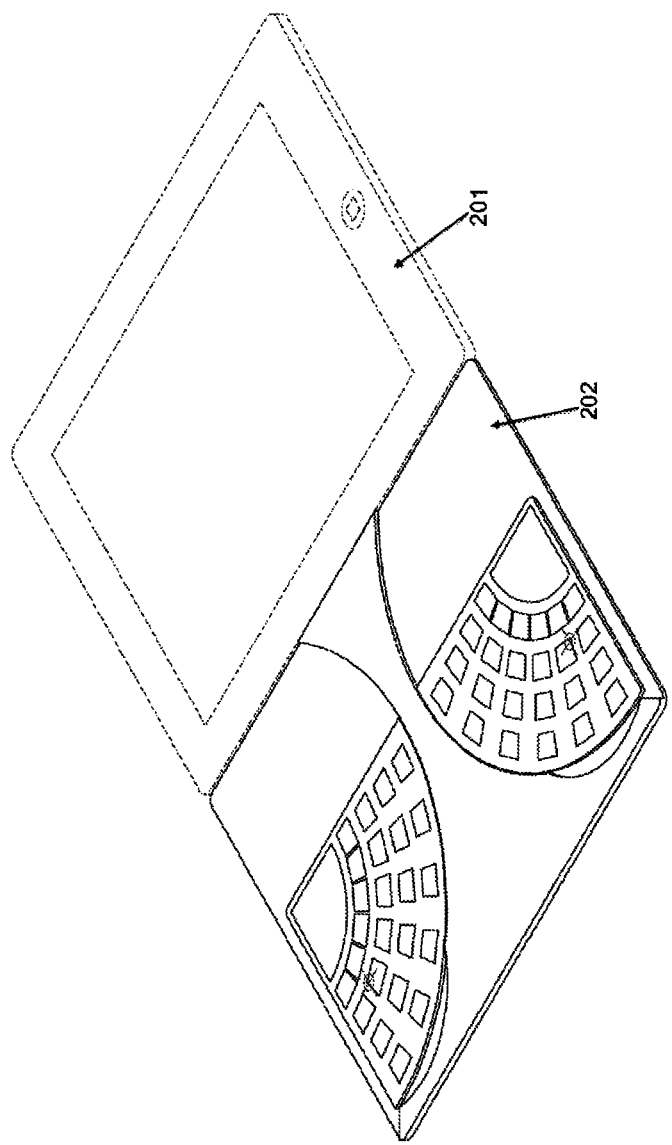
FIG. 2 shows a diagram illustrating a rearward-facing keyboard that is hinge-connected to one edge of a tablet computer and flipped open into a horizontal position in accordance to one embodiment of the presently claimed invention.
Figure 3:
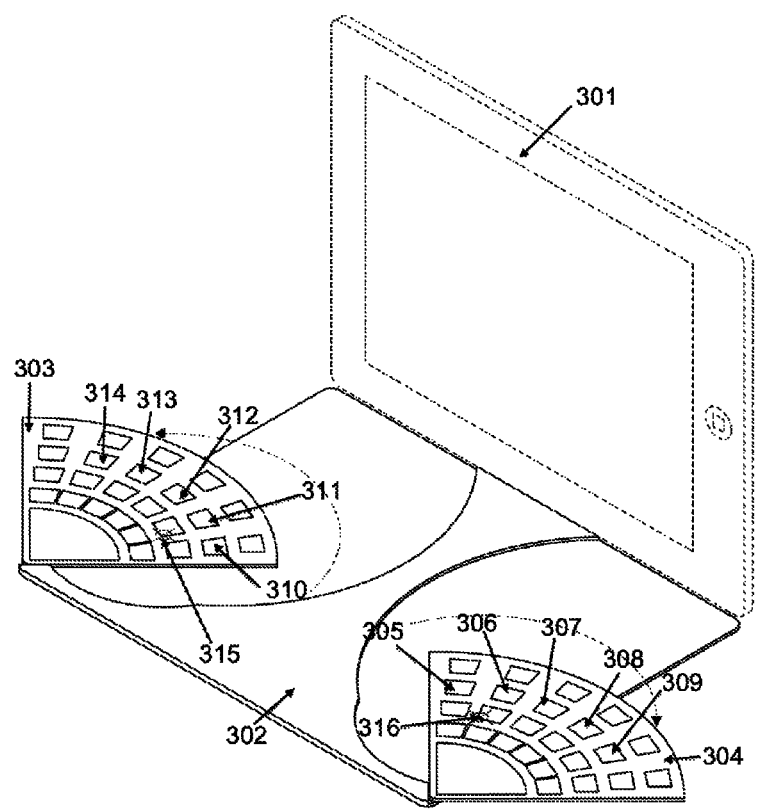
FIG. 3 shows a diagram illustrating a rearward-facing keyboard that is flipped open into a traditional front facing position with the two partial fields of keys being rotated outward in accordance to one embodiment of the presently claimed invention.

Referring to FIG. 2 and FIG. 3. In accordance to another embodiment of the presently claimed invention, the rearward-facing keyboard 202 can be flipped, being hinge-connected to one edge of the tablet computer or mobile computing device 201, from the back of the tablet computer or mobile computing device 201, first to a completely opened horizontal position as shown in FIG. 2, then to the front of and proximately perpendicular to the tablet computer or mobile computing device as shown in FIG. 3. In this position, the keyboard 302 is laid before the user and the keyboard and tablet computer or mobile computing device setup resembles a laptop computer as shown in FIG. 3.

Referring to FIG. 3. As the rearward-facing keyboard 302 turns into a front-facing keyboard, the keys must be rearranged to the front-facing orientation. The two partial fields of keys 303 and 304 rotate outward about the vertical axis 315 and 316 respectively such that the keys in the front-facing orientation correspond approximately to those of a traditional front-facing keyboard. To illustrate this front-facing orientation of the QWERTY keyboard layout, key 305 is for the letter "Y", key 306 is for the letter "U", key 307 is for the letter "I", key 308 is for the letter "O", key 309 is for the letter "P", key 310 is for the letter "T", key 311 is for the letter "R", key 312 is for the letter "E", key 313 is for the letter "W", and key 314 is for the letter "Q".

In accordance to various embodiments of the presently claimed invention, the keys of the rearward-facing keyboard can be mechanical tactile keys or touch sensing keys. In accordance to various embodiments, the keys can also be reassigned different letters, numbers, and symbols through software and/or hardware configuration during assembly or during usage runtime.

Although the present invention is being primarily described in association with the QWERTY keyboard layout, the present invention can be adapted without undue experimentation and similarly be applied to other keyboard layouts including non-Latin based language keyboard layouts.

The aforementioned tablet computers and mobile computing devices can be any commercially available devices including, but are not limited to, the Apple® iPad®, Apple® iPhone®, Samsung® Galaxy®, and Amazon® Kindle®.

The embodiments disclosed herein may be implemented using a combination of electro-mechanical assembly of keys and buttons and a general purpose or specialized computing device, computer processor, or electronic circuitry including but not limited to a digital signal processor (DSP), application specific integrated circuit (ASIC), a field programmable gate array (FPGA), and other programmable logic device configured or programmed according to the teachings of the present disclosure. Computer instructions or software codes running in the general purpose or specialized computing device, computer processor, or programmable logic device can readily be prepared by practitioners skilled in the electronic art based on the teachings of the present disclosure.

The foregoing description of the present invention has been provided for the purposes of illustration and description. It is not intended to be exhaustive or to limit the invention to the precise forms disclosed. Many modifications and variations will be apparent to practitioners skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A rearward-facing keyboard for a mobile computing device, comprising:
    a first partial field of keys, comprising a first group of keys for left-hand fingers, wherein the first group of keys is arranged such that the keys are placed in mirror-opposite of positions that they would have been in a front-facing keyboard; and
    a second partial field of keys, comprising a second group of keys for right-hand, wherein the second group of keys is arranged such that the keys are placed in mirror-opposite of positions that they would have been in a front-facing keyboard fingers;
    wherein the rearward-facing keyboard being attached on to back of the mobile computing device in a way that back of the rearward-facing keyboard is facing and parallel to the back of the mobile computing device while the keys of the rearward-facing keyboard are facing rearward away from its user as the user holds and faces front of the mobile computing device;
    wherein the rearward-facing keyboard can be flipped from the back of the mobile computing device to the front of and proximately perpendicular to the mobile computing device such that the rearward-facing keyboard is laid before its user; and
    wherein the first partial field being rotatable about a first vertical axis and the second partial field being rotatable about a second vertical axis such that when the first and second partial fields are rotated towards the mobile computing device from their respective original positions, the keys of the rearward-facing keyboard are in their front-facing orientation.

2. The rearward-facing keyboard of claim 1, wherein the rearward-facing keyboard being a detachable ancillary peripheral to the mobile computing device.

3. The rearward-facing keyboard of claim 1, wherein the rearward-facing keyboard being a built-in feature of the mobile computing device.

4. The rearward-facing keyboard of claim 1, wherein the rearward-facing keyboard having a QWERTY keyboard layout.

5. The rearward-facing keyboard of claim 1, wherein the keys of the rearward-facing keyboard being mechanical tactile keys.

6. The rearward-facing keyboard of claim 1, wherein the keys of the rearward-facing keyboard being touch sensing keys.

7. The rearward-facing keyboard of claim 1, wherein letter, number, and symbol assignments of the keys of the rearward-facing keyboard being configurable.

8. A rearward-facing keyboard for a mobile computing device, comprising:
    a first partial field of keys, comprising a first group of keys for left-hand fingers, wherein the first group of keys is arranged such that the keys are placed in mirror-opposite of positions that they would have been in a front-facing keyboard; and
    a second partial field of keys, comprising a second group of keys for right-hand, wherein the second group of keys is arranged such that the keys are placed in mirror-opposite of positions that they would have been in a front-facing keyboard fingers;
    wherein the rearward-facing keyboard being attached on to back of the mobile computing device in a way that back of the rearward-facing keyboard is facing and parallel to the back of the mobile computing device while the keys of the rearward-facing keyboard are facing rearward away from its user as the user holds and faces front of the mobile computing device; and
    wherein key layouts of the first and second partial fields curve to form parallel arcs such that each of the first and second partial field of keys proximately resembles a quarter slice of a circle such that the key layouts match closely to natural positions of fingers and angling of hands while holding the mobile computing device and typing on the rearward-facing keyboard.

9. The rearward-facing keyboard of claim 8, wherein the rearward-facing keyboard being a detachable ancillary peripheral to the mobile computing device.

10. The rearward-facing keyboard of claim 8, wherein the rearward-facing keyboard being a built-in feature of the mobile computing device.

11. The rearward-facing keyboard of claim 8, wherein the rearward-facing keyboard having a QWERTY keyboard layout.

12. The rearward-facing keyboard of claim 8, wherein the rearward-facing keyboard can be flipped from the back of the mobile computing device to front of and proximately perpendicular to the mobile computing device such that the rearward-facing keyboard is laid before its user; and
    wherein the first partial field being rotatable about a first vertical axis and the second partial field being rotatable about a second vertical axis such that when the first and second partial fields are rotated outward from their respective original positions, the keys of the rearward-facing keyboard are in their front-facing orientation.

13. The rearward-facing keyboard of claim 8, wherein the keys of the rearward-facing keyboard being mechanical tactile keys.

14. The rearward-facing keyboard of claim 8, wherein the keys of the rearward-facing keyboard being touch sensing keys.

15. The rearward-facing keyboard of claim 8, wherein letter, number, and symbol assignments of the keys of the rearward-facing keyboard being configurable.

* * * * *